United States Patent [19]
Sunder et al.

[11] Patent Number: 5,876,638
[45] Date of Patent: Mar. 2, 1999

[54] STRUCTURED PACKING ELEMENT WITH BI-DIRECTIONAL SURFACE TEXTURE AND A MASS AND HEAT TRANSFER PROCESS USING SUCH PACKING ELEMENT

[75] Inventors: Swaminathan Sunder, Allentown; Mark Robert Pillarella, Macungie; Frank Jude Riska, Palmerton, all of Pa.

[73] Assignee: Air Products and Chemicals, Inc., Allentown, Pa.

[21] Appl. No.: 647,495

[22] Filed: May 14, 1996

[51] Int. Cl.$^6$ .......................................... B01F 3/04
[52] U.S. Cl. ............................................. 261/112.2
[58] Field of Search ........................................ 261/112.2

[56] References Cited

U.S. PATENT DOCUMENTS

| | | | |
|---|---|---|---|
| D. 254,506 | 3/1980 | Holmberg | 261/112.2 |
| 3,540,702 | 11/1970 | Oyama | 261/112.2 |
| 3,785,620 | 1/1974 | Huber | 261/112.2 |
| 3,963,810 | 6/1976 | Holmberg et al. | 261/112.2 |
| 4,186,159 | 1/1980 | Huber | 261/112 |
| 4,296,050 | 10/1981 | Meier | 261/112 |
| 4,455,339 | 6/1984 | Meier | 428/185 |
| 4,597,916 | 7/1986 | Chen | 261/94 |
| 4,604,247 | 8/1986 | Chen et al. | 261/94 |
| 4,950,430 | 8/1990 | Chen et al. | 261/112.2 |
| 4,981,621 | 1/1991 | Pluss | 261/112.2 |
| 5,132,056 | 7/1992 | Lockett et al. | 261/112.2 |
| 5,188,773 | 2/1993 | Chen et al. | 261/112.2 |
| 5,267,444 | 12/1993 | Lehman et al. | 261/112.2 |
| 5,419,136 | 5/1995 | McKeigue | 62/906 |
| 5,454,988 | 10/1995 | Maeda | 261/112.2 |
| 5,653,126 | 8/1997 | Harada et al. | 62/906 |

FOREIGN PATENT DOCUMENTS

| | | | |
|---|---|---|---|
| 0337151OA1 | 10/1989 | European Pat. Off. | |
| 2810094 | 10/1978 | Germany | 261/112.2 |

*Primary Examiner*—Tim R. Miles
*Attorney, Agent, or Firm*—Willard Jones, II

[57] ABSTRACT

The present invention provides for a structured packing element, the element being corrugated with corrugations which form alternating peaks and troughs across the element, the corrugations having a longitudinal axis, the element having at least one band of first fluting at an angle between 0° and 180° to the longitudinal axis of the corrugations and at least one band of second fluting at an angle between 0° and 180° to the longitudinal axis of the corrugations, the first fluting being at an angle greater than zero to the second fluting. The element preferably has a plurality of holes through the element. The foregoing structured packing is suited for use in processes requiring a contact device for accomplishing mass and/or heat transfer. The foregoing structured packing is particularly suited for a cryogenic air separation process comprising contacting vapor and liquid countercurrently in at least one distillation column containing at least one mass transfer zone wherein liquid-vapor contact is established by at least one structured packing element.

43 Claims, 17 Drawing Sheets

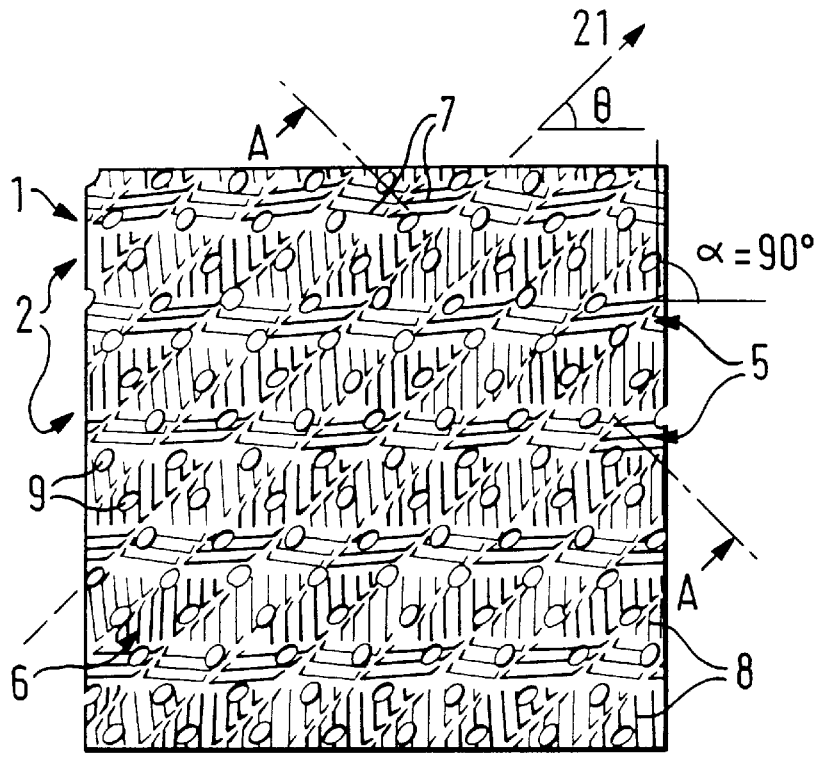
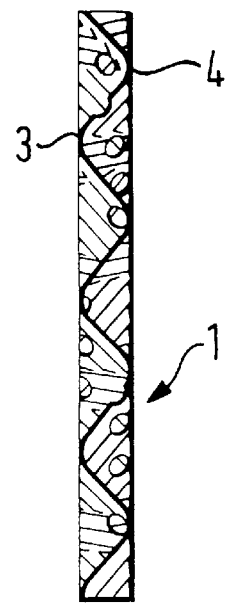
FIG. 2a
FIG. 2b
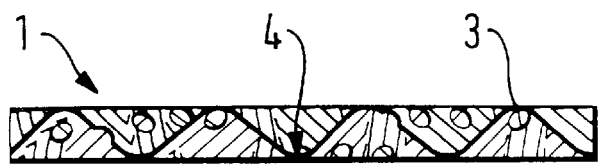
FIG. 2c
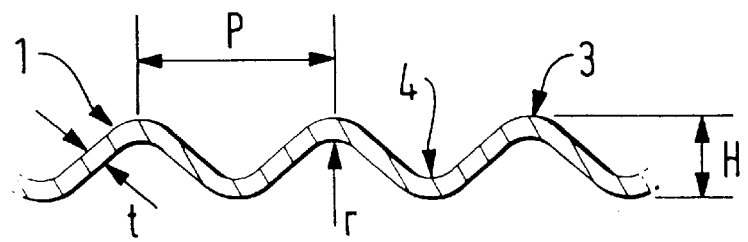
FIG. 2d

STRUCTURED PACKING ELEMENT WITH BI-DIRECTIONAL SURFACE TEXTURE AND A MASS AND HEAT TRANSFER PROCESS USING SUCH PACKING ELEMENT

FIELD OF THE INVENTION

The present invention relates to structured packing. The structured packing has particular application in exchange columns, especially in cryogenic air separation processes, though it may also be used in heat exchangers for example.

BACKGROUND OF THE INVENTION

In many processes, such as distillation or direct contact cooling, it is advantageous to use structured packing to promote heat and mass transfer between liquid and vapor streams which flow countercurrently to each other inside a column. Structured packing offers the benefit of high efficiency for heat and mass transfer combined with low pressure drop, when it is compared with dumped or random packing or with distillation trays. The most commonly used structured packing consists of corrugated sheets of metal or plastics foil or corrugated mesh cloths stacked vertically. These foils have various forms of apertures and/or surface roughening features aimed at improving the heat and mass transfer efficiency. While there are many types of structured packing described in the prior art, some of which are discussed below, they have evolved from a variety of applications and most have not been developed or optimized specifically for cryogenic separation processes, such as those used for separating the components of air.

U.S. Pat. No. 4,296,050 (Meier) describes the use of the combination of apertures with fluting or grooves in a structured packing. The fluting runs at an angle of 15°–90° to the vertical, in a direction generally opposed to that of the corrugations, which run at an angle of 15°–60° to the vertical. The wavelength of the fluting is in the range of 0.3 to 3.0 mm. The packing has widespread application in a variety of heat and mass transfer processes.

U.S. Pat. No. 4,186,159 (Huber) discloses a structured packing having alternating bands of fluted and unfluted (plain) regions which run horizontally across the packing when it is viewed in its intended orientation within the column. The extent of these bands is at least 5 mm. The open area is specified to be 5–20%.

U.S. Pat. No. 4,455,339 (Meier) describes the use of alternating corrugated and uncorrugated portions within each sheet of structured packing. The liquid acceleration, which would occur in the uncorrugated portions, is claimed to improve mass transfer performance.

U.S. Pat. No. 4,597,916 and U.S. Pat. No. 4,604,247 (Chen et al.) describe the use of crisscrossing patterns produced by expanded metal. They also show the use of perforations in combination with the crisscrossing patterns or horizontal slits. The use of perforated sheets alternating with corrugated sheets, both with a variety of holes and features, is also disclosed.

EP-A-337150 (Lockett et al.) describes the use of especially deep fluting which is said to improve the mass transfer performance due to increased liquid hold up and better spreading.

U.S. Pat. No. 4,981,621 (Pluss) describes the use of crisscrossing texture without holes, which improve the liquid spreading.

U.S. Pat. No. 5,132,056 (Lockett et al.) describes the use of edge modification to improve wetting, especially under turndown conditions.

U.S. Pat. No. 5,454,988 (Maeda) discloses the use of special fluting in a corrugated packing with no holes. The fluting generally runs in a horizontal direction and is more square-wave like than sine-wave like in cross-section. The fluting also has a meandering flow path for laterally spreading liquid.

It is also well-known in the prior art that mesh type packing helps spread liquid efficiently and gives good mass transfer performance, but mesh type of packing is much more expensive than most of the foil type packing described above.

An object of the present invention is to provide a specific structure that shows high performance characteristics for cryogenic applications such as those used in air separation.

A further object of the present invention is to generalize the specific structure such that it also shows a high performance in other, and preferably all, heat and mass transfer applications.

SUMMARY OF THE INVENTION

According to a first aspect of the present invention, there is provided a structured packing element, the element being corrugated with corrugations which form alternating peaks and troughs across the element, the corrugations having a longitudinal axis, the element having at least one band of first fluting at an angle between 0° and 180° to the longitudinal axis of the corrugations and at least one band of second fluting at an angle between 0° and 180° to the longitudinal axis of the corrugations, the first fluting being at an angle greater than zero to the second fluting.

The element preferably has a plurality of holes through the element. The open area of the element may be in the range of 5 to 20%, and preferably in the range of 8% to 12%, of the total area of the element.

The element preferably has plural bands of first fluting and plural bands of second fluting. The first fluting is preferably substantially continuous across the element and intersects the second fluting.

The band of first fluting may have a width in the range of 2 to 20 mm and preferably 5 to 10 mm. The band of second fluting may have a width in the range of 2 to 20 mm and preferably 5 to 10 mm.

The first and the second fluting may each be formed by grooves having a wavelength in the range of 0.5 mm to 5 mm and preferably 1 mm to 3 mm.

The angle ($\alpha$) between the first fluting and the second fluting of the developed element as seen in elevation may be in the range of 30° to 150° and is preferably in the range of 80° to 100° and most preferably 90°.

According to a second aspect of the present invention, there is provided an exchange column for exchanging heat and/or mass between a first phase and a second phase, the exchange column comprising a plurality of packing elements, each element being corrugated with corrugations which form alternating peaks and troughs across the element, the corrugations having a longitudinal axis, each element having at least one band of first fluting at an angle between 0° and 180° to the longitudinal axis of the corrugations and at least one band of second fluting at an angle between 0° and 180° to the longitudinal axis of the corrugations, the first fluting being at an angle greater than zero to the second fluting.

The elements may be packed substantially vertically with the first fluting forming an angle of between 0° and 45°, preferably between 0° and 30° and more preferably between 0° and 10°, with the horizontal. The second fluting may form an angle substantially between 0° and 45°, preferably between 0° and 30° and more preferably between 0° and 10°, with the vertical. Most preferably, the elements are packed substantially vertically, the first fluting being substantially horizontal and the second fluting being substantially vertical.

The longitudinal axis of the corrugations may be at an angle substantially between 20° and 70°, preferably between 30° and 60° and most preferably at an angle of substantially 45° with the horizontal.

Each element in the exchanger may have a plurality of holes through the element.

In another aspect, the invention also provides a structured packing element, the element being corrugated with corrugations which form alternating peaks and troughs across the element, the corrugations having a longitudinal axis, the element having plural bands of first fluting at an angle between 0° and 180° to the longitudinal axis of the corrugations and plural bands of second fluting at an angle between 0° and 180° to the longitudinal axis of the corrugations, the first fluting being at an angle greater than zero to the second fluting, the first fluting being substantially continuous across the element and intersecting the second fluting, and comprising a plurality of holes through the element.

In yet another aspect, there is provided a process for cryogenic air separation comprising contacting vapor and liquid countercurrently in at least one distillation column containing at least one mass transfer zone wherein liquid-vapor contact is established by at least one structured packing element, the element being corrugated with corrugations which form alternating peaks and troughs across the element, the corrugations having a longitudinal axis, the element having at least one band of first fluting at an angle between 0° and 180° to the longitudinal axis of the corrugations and at least one band of second fluting at an angle between 0° and 180° to the longitudinal axis of the corrugations, the first fluting being at an angle greater than zero to the second fluting.

The present invention provides a corrugated structured packing element that shows high performance characteristics for heat and mass transfer applications.

In use, in a preferred embodiment, the adjacent sheets of the packing elements are stacked vertically, the corrugations running in a crisscrossing and opposing fashion; the sheets of the packing elements build up a layer which covers a cylindrical section of a packed tower, which itself is configured as a tall vertical cylinder; the many layers that constitute the packed section of a given column or tower are rotated relative to one another about the column axis which is generally vertical; and, vapor and liquid are fed via distributors and preferably flow in roughly countercurrent directions.

BRIEF DESCRIPTION OF THE DRAWINGS

Embodiments of the invention will now be described by way of example with reference to the accompanying drawings, in which:

FIGS. 2a to 2d are respectively a front elevation, a side elevation, an end view, and a cross-sectional view of the example of FIG. 1;

DETAILED DESCRIPTION OF THE INVENTION

Figure 1:
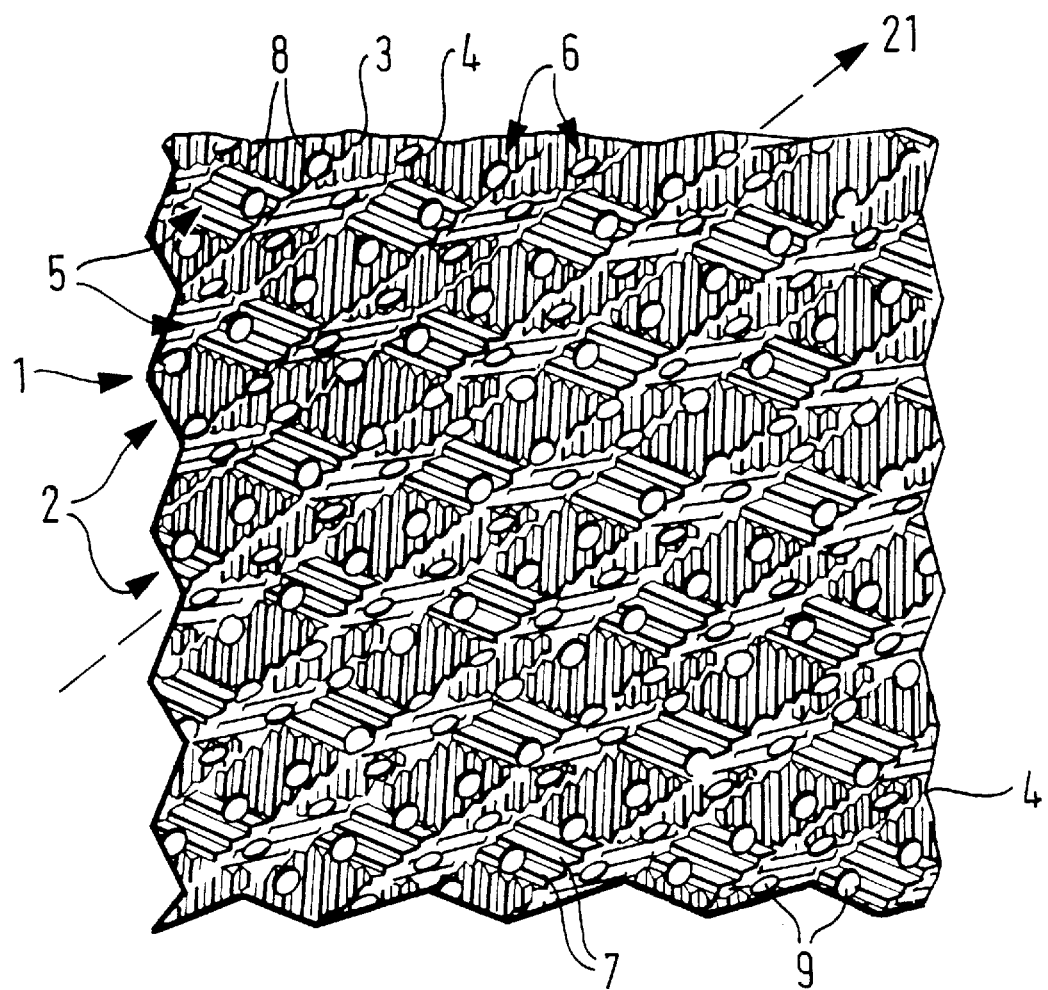
FIG. 1 is a perspective view of a first example of a packing element.
Figure 3:
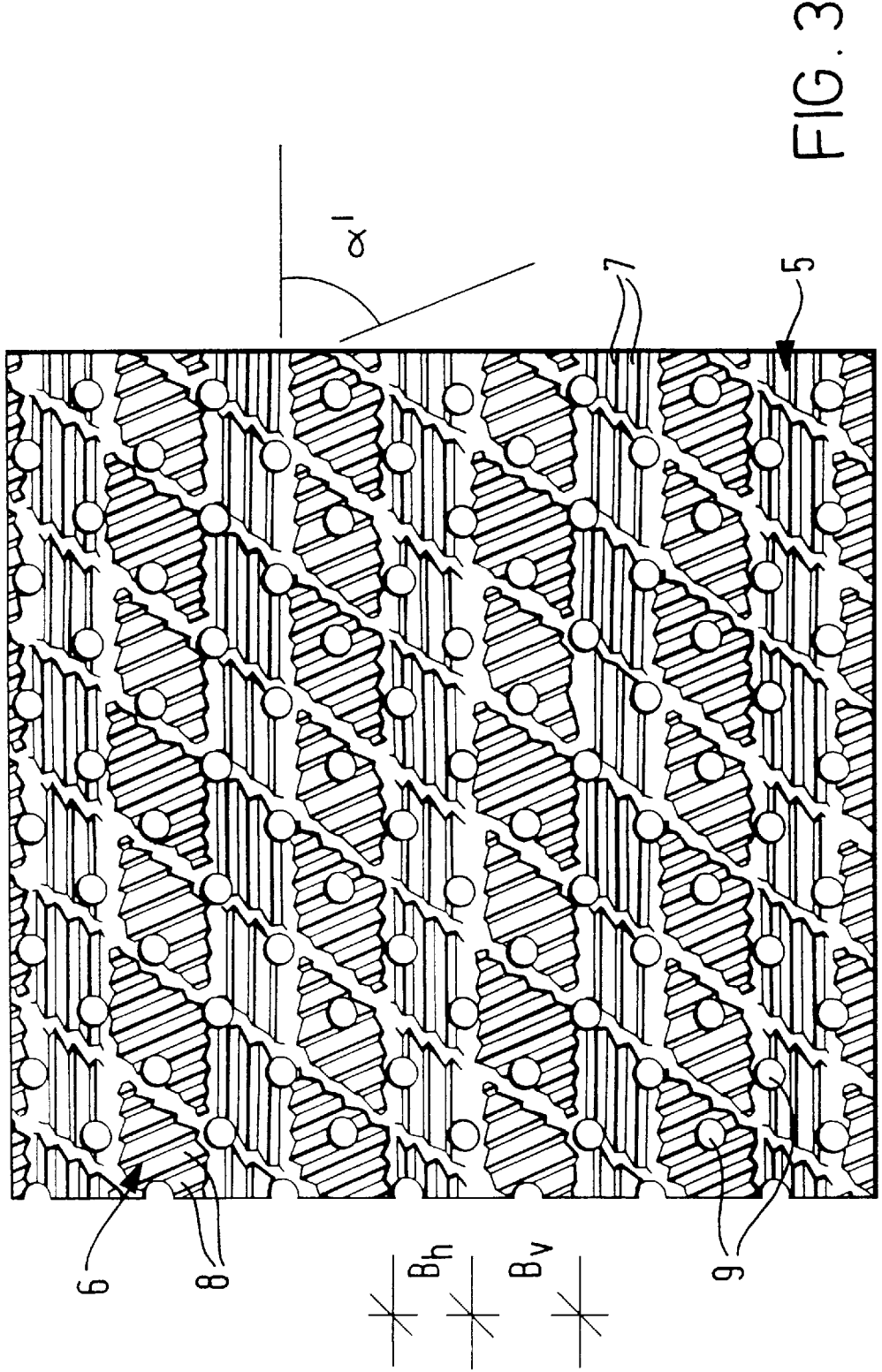
FIG. 3 is a front elevation of the example of FIG. 1 in a plain sheet form prior to being corrugated.
Figure 4A:
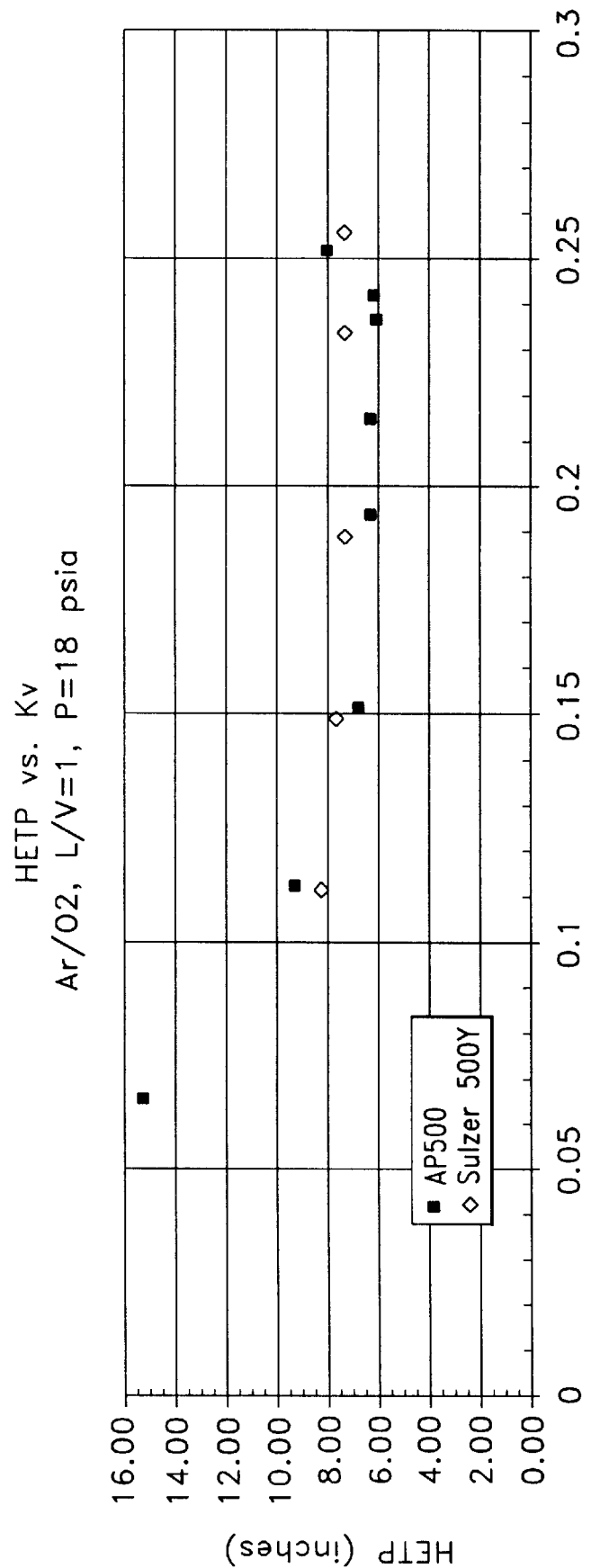
FIGS. 4a to 9b are graphs demonstrating the performance of the packing element of the invention compared to a prior art packing element.
Figure 4B:
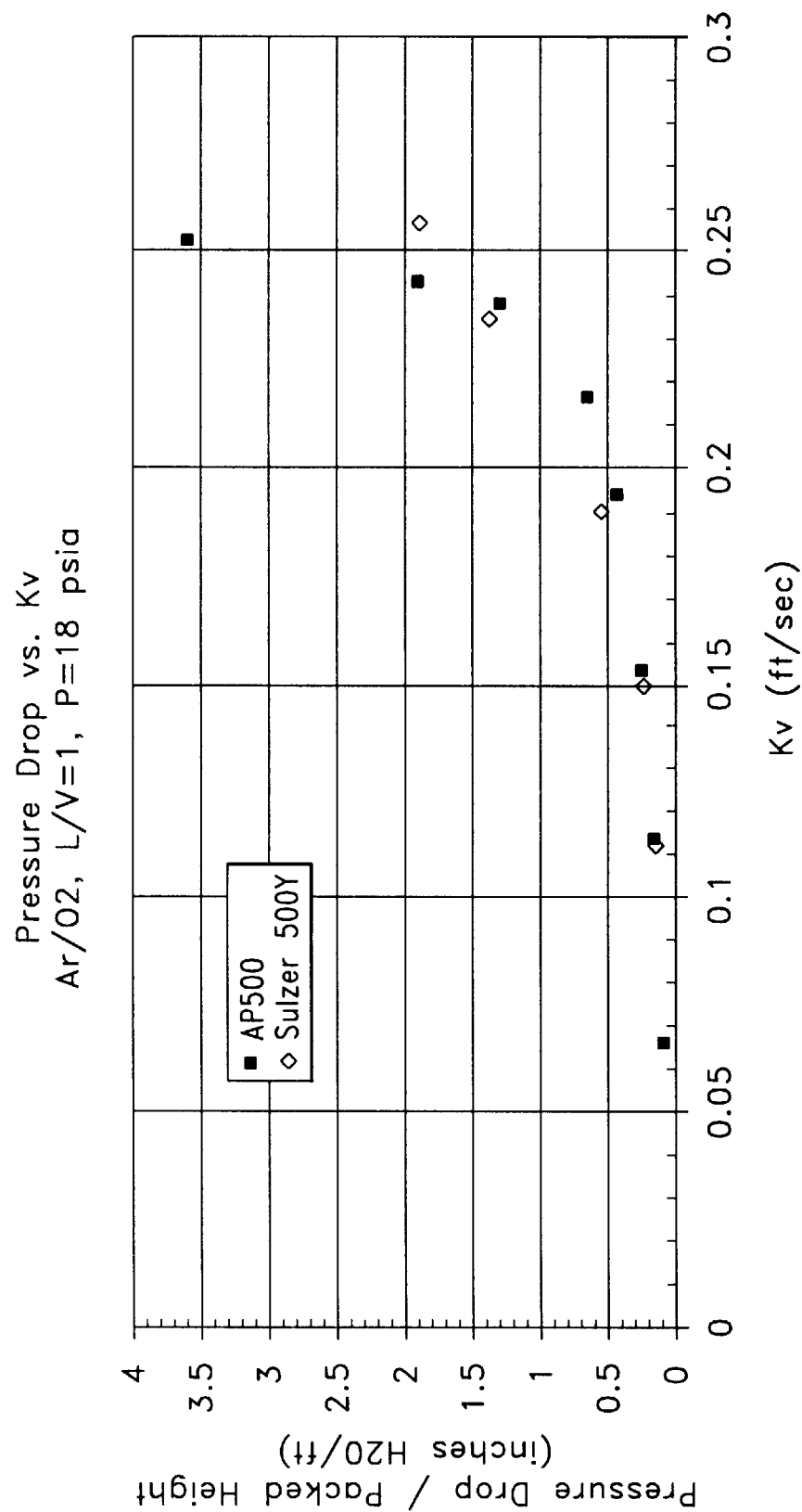
Figure 5A:
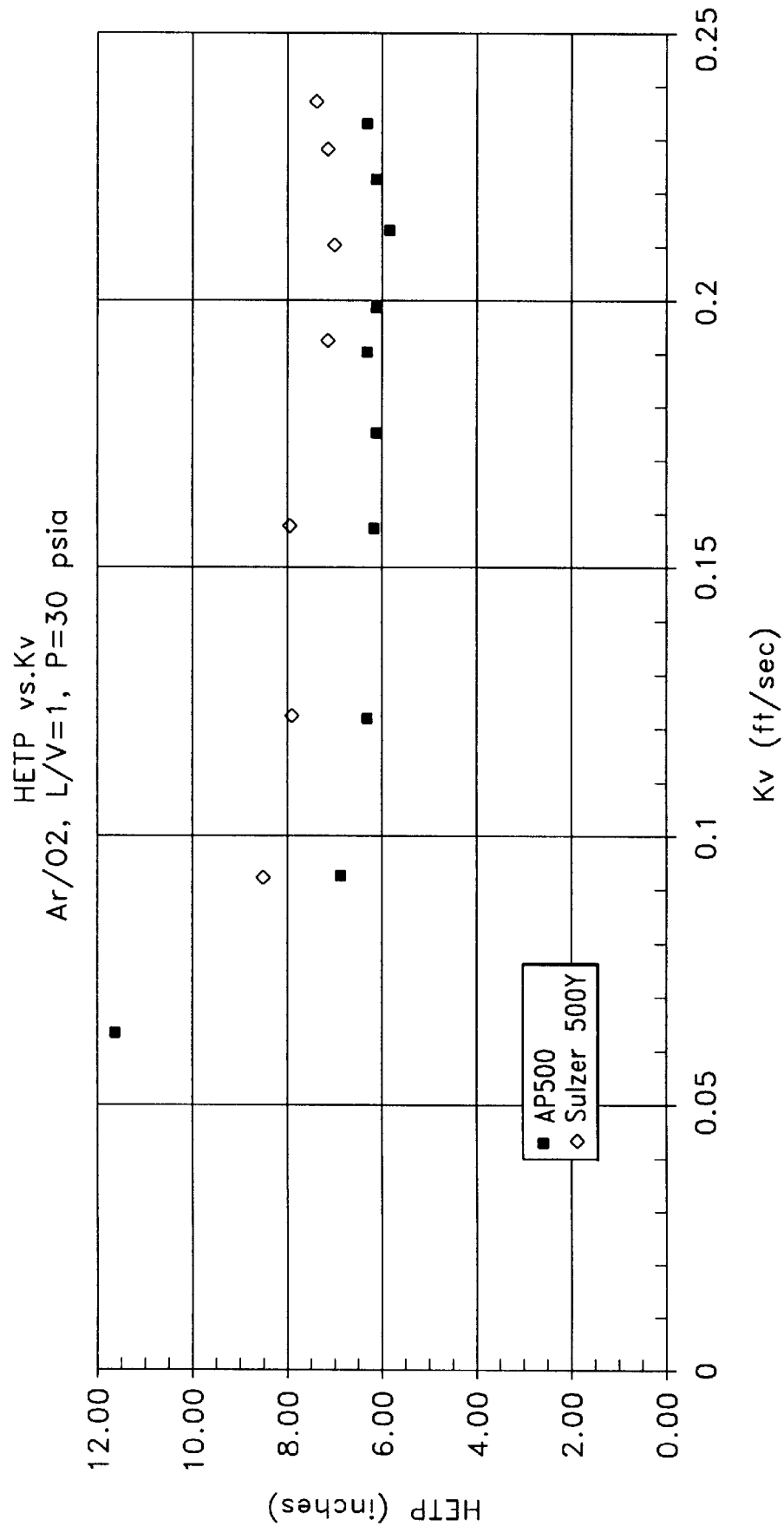
Figure 5B:
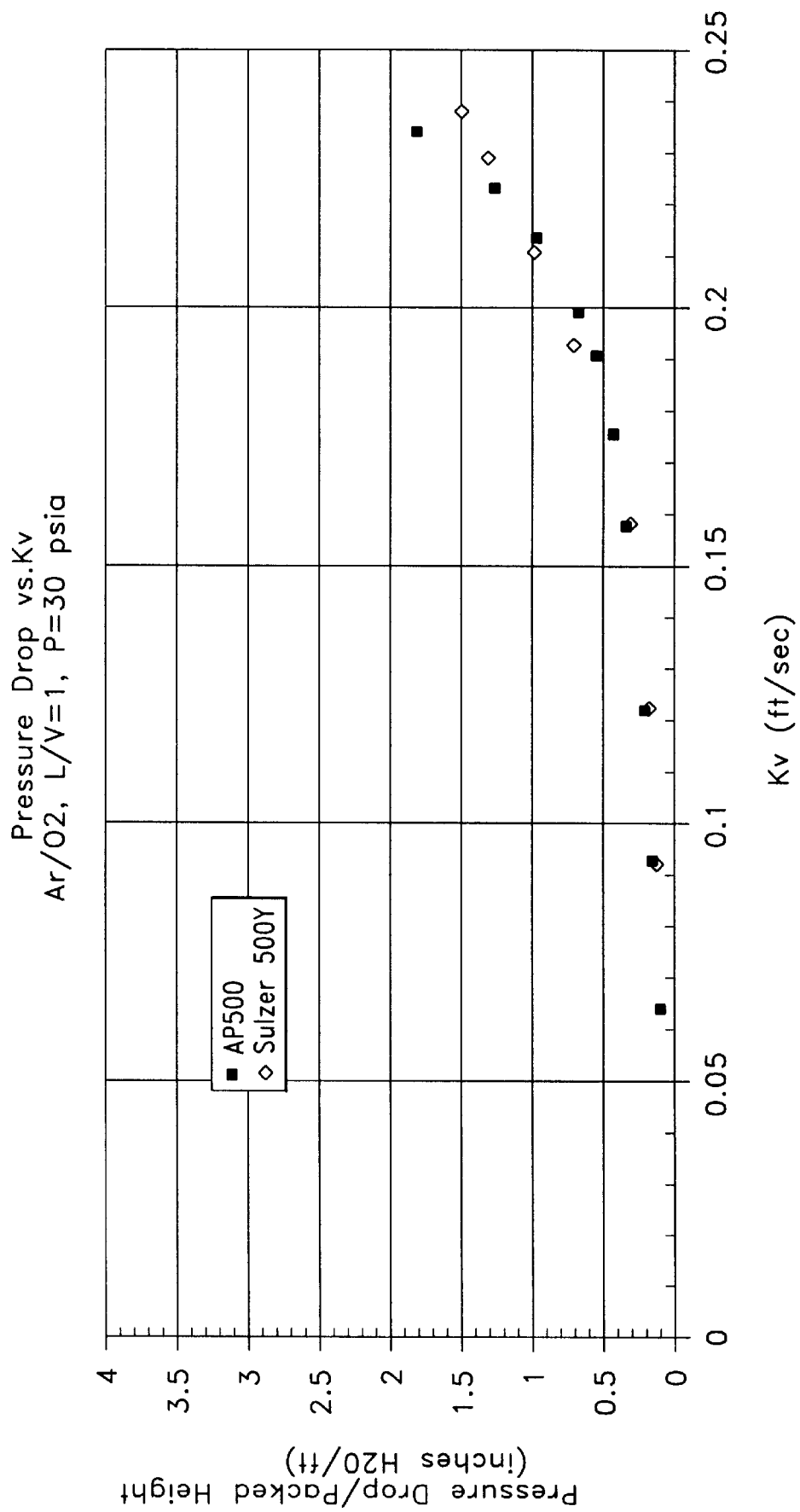
Figure 6A:
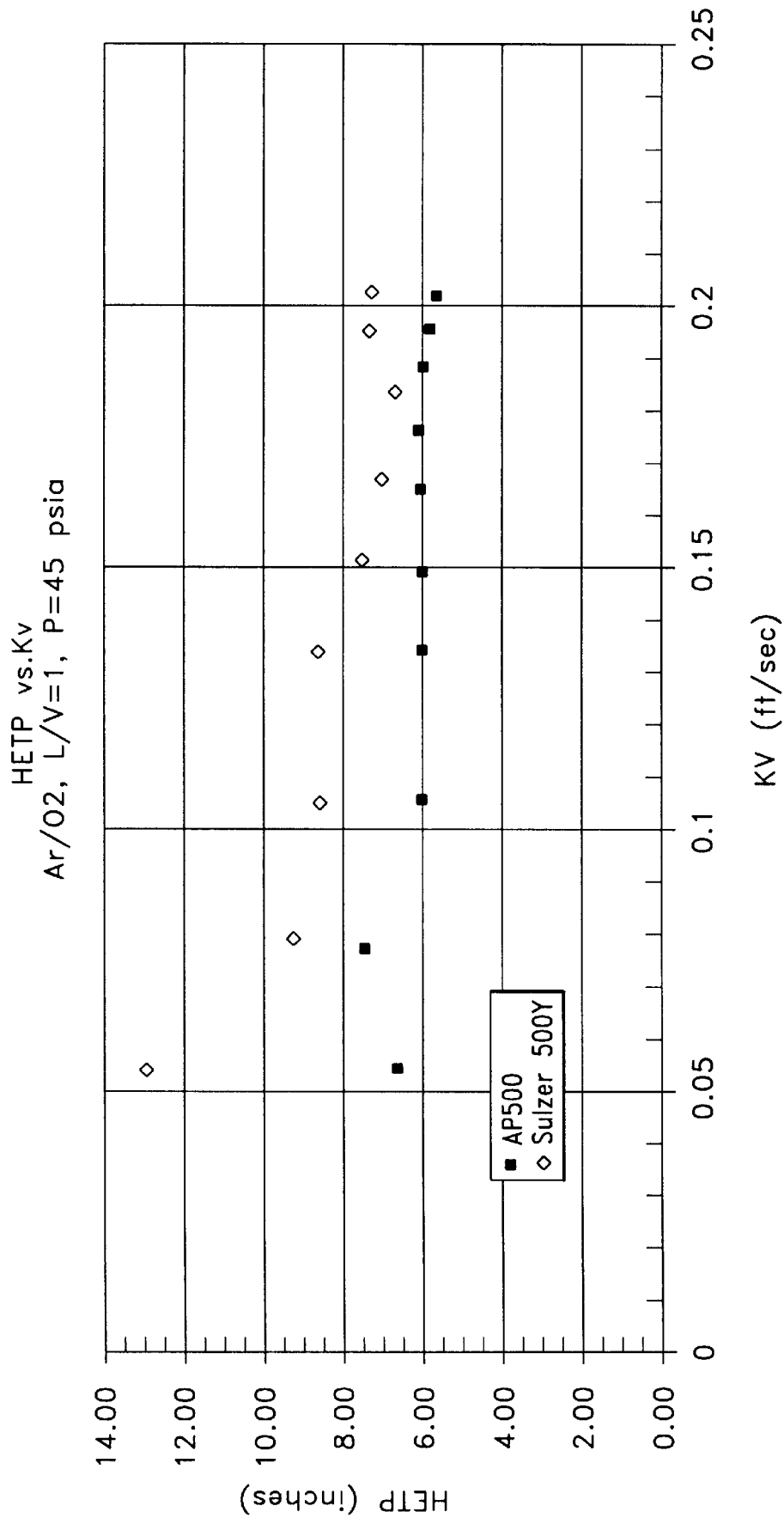
Figure 6B:
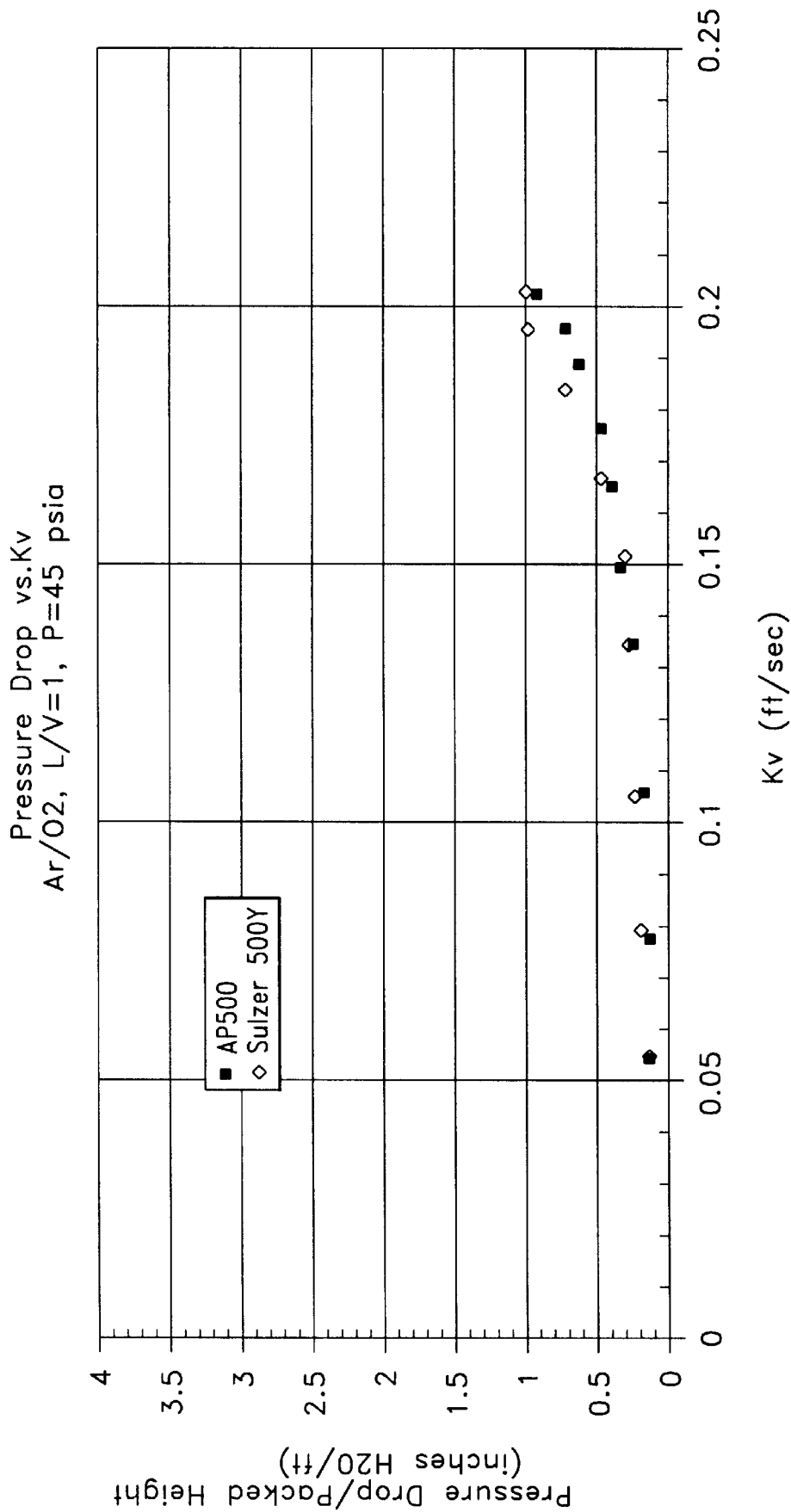
Figure 7A:
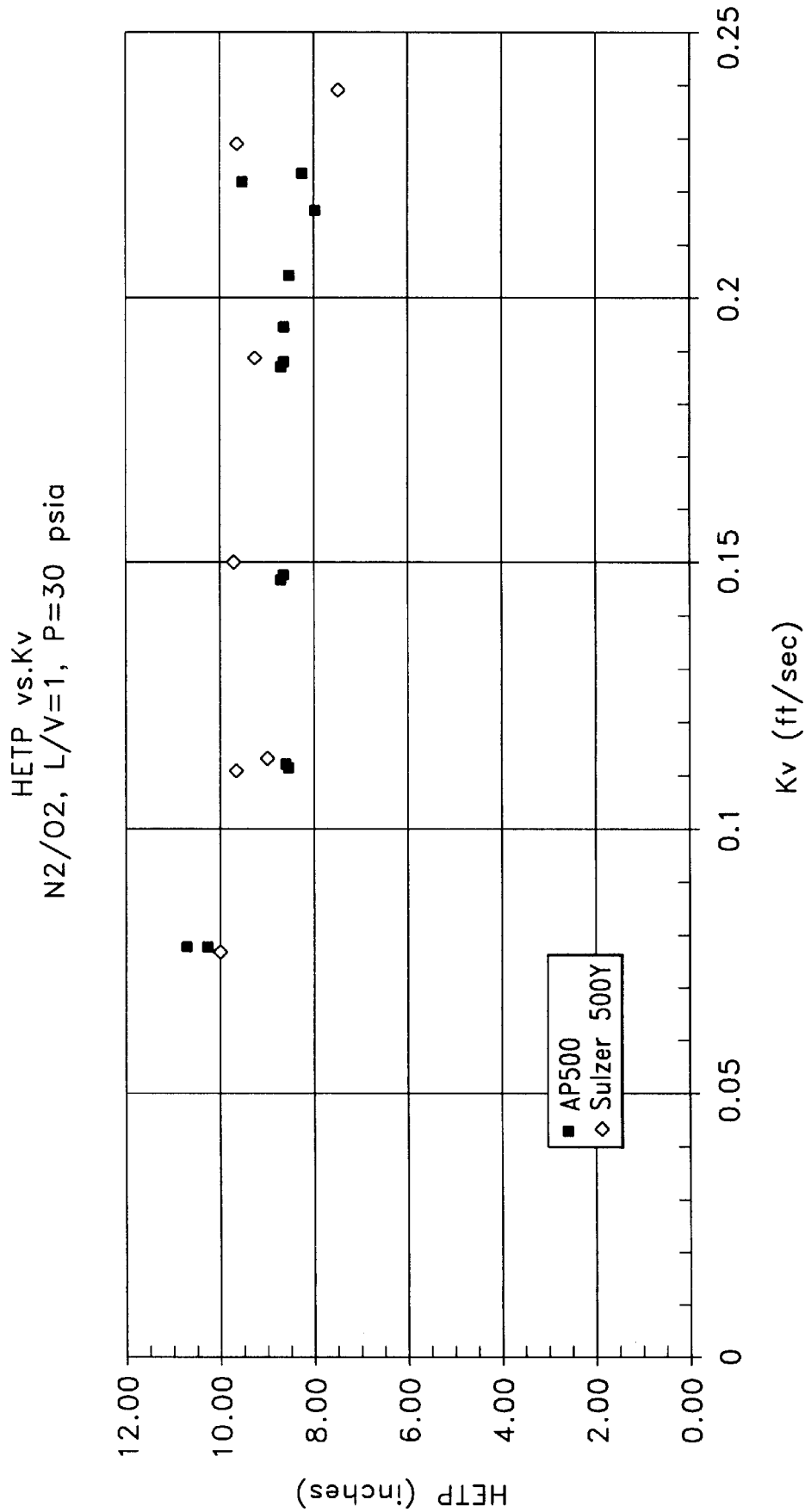
Figure 7B:
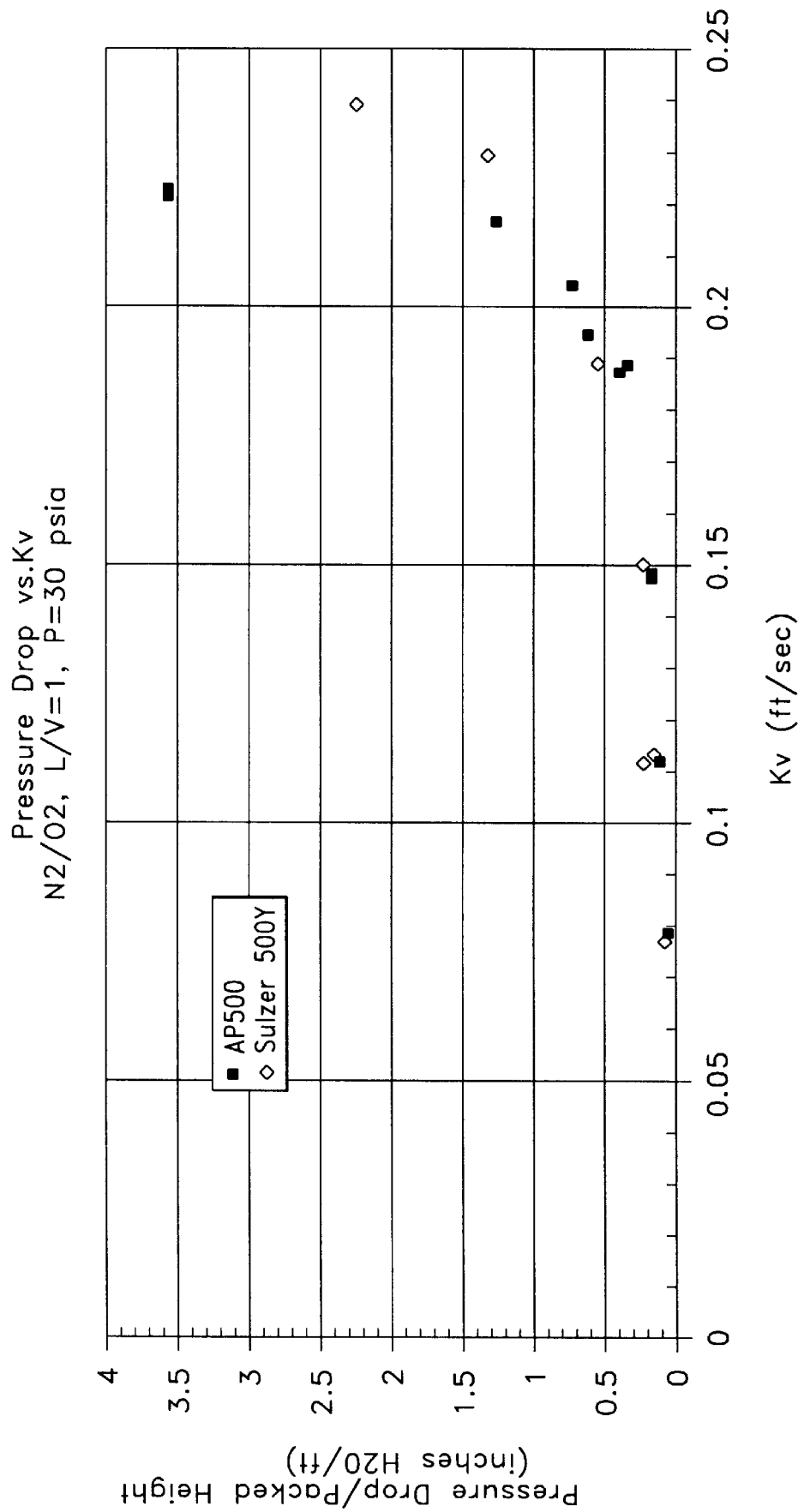
Figure 8A:
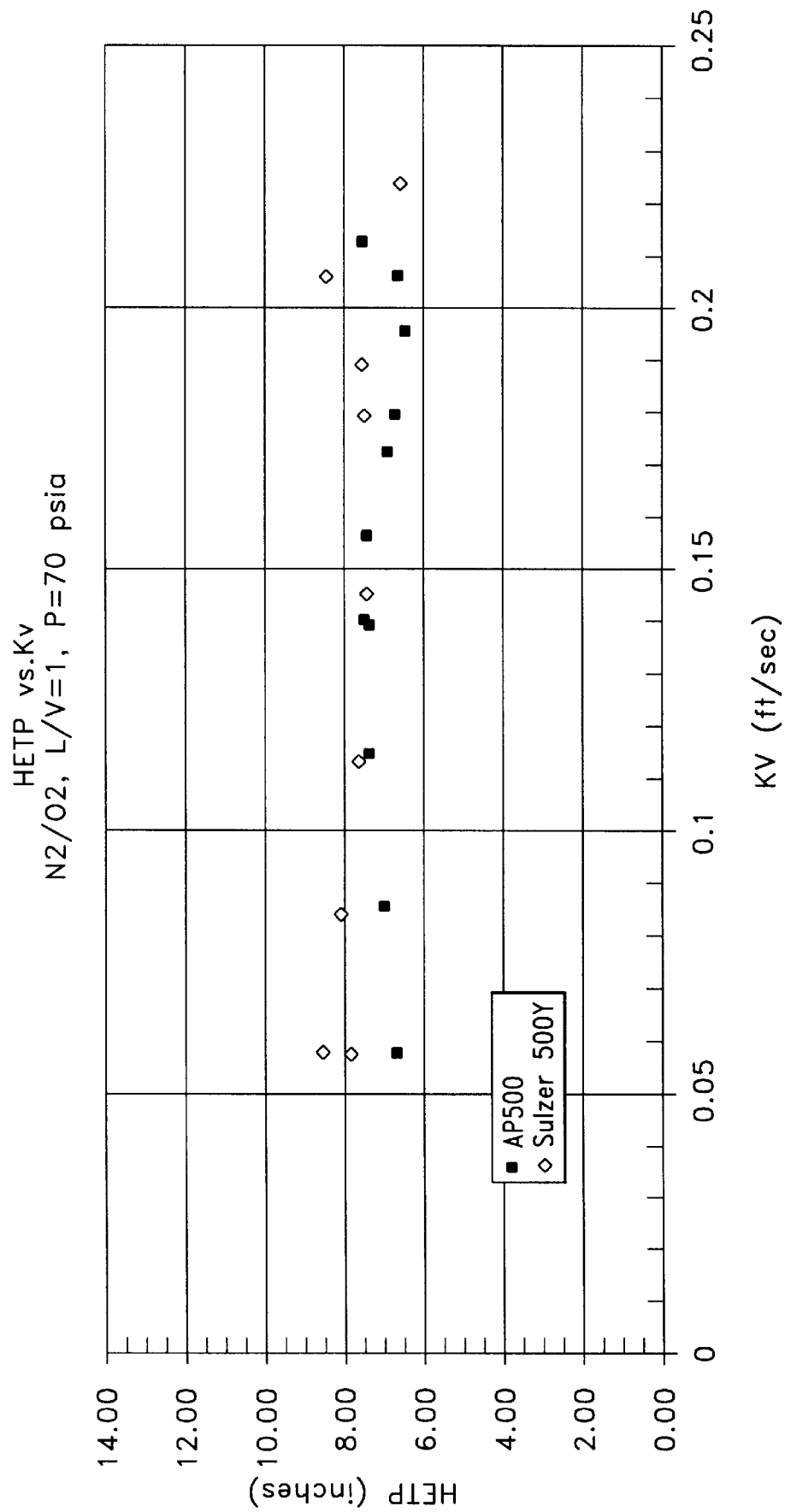
Figure 8B:
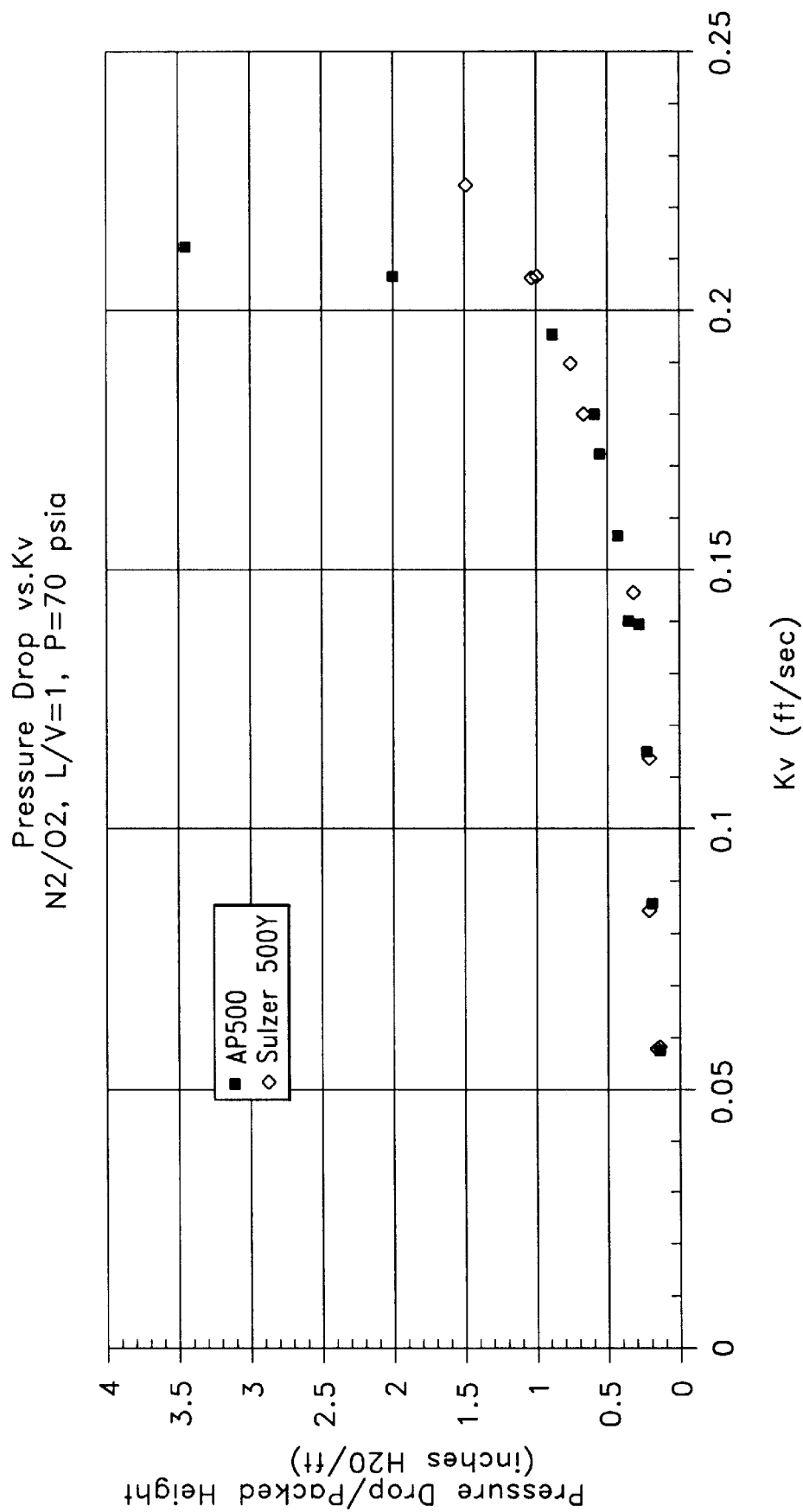
Figure 9A:
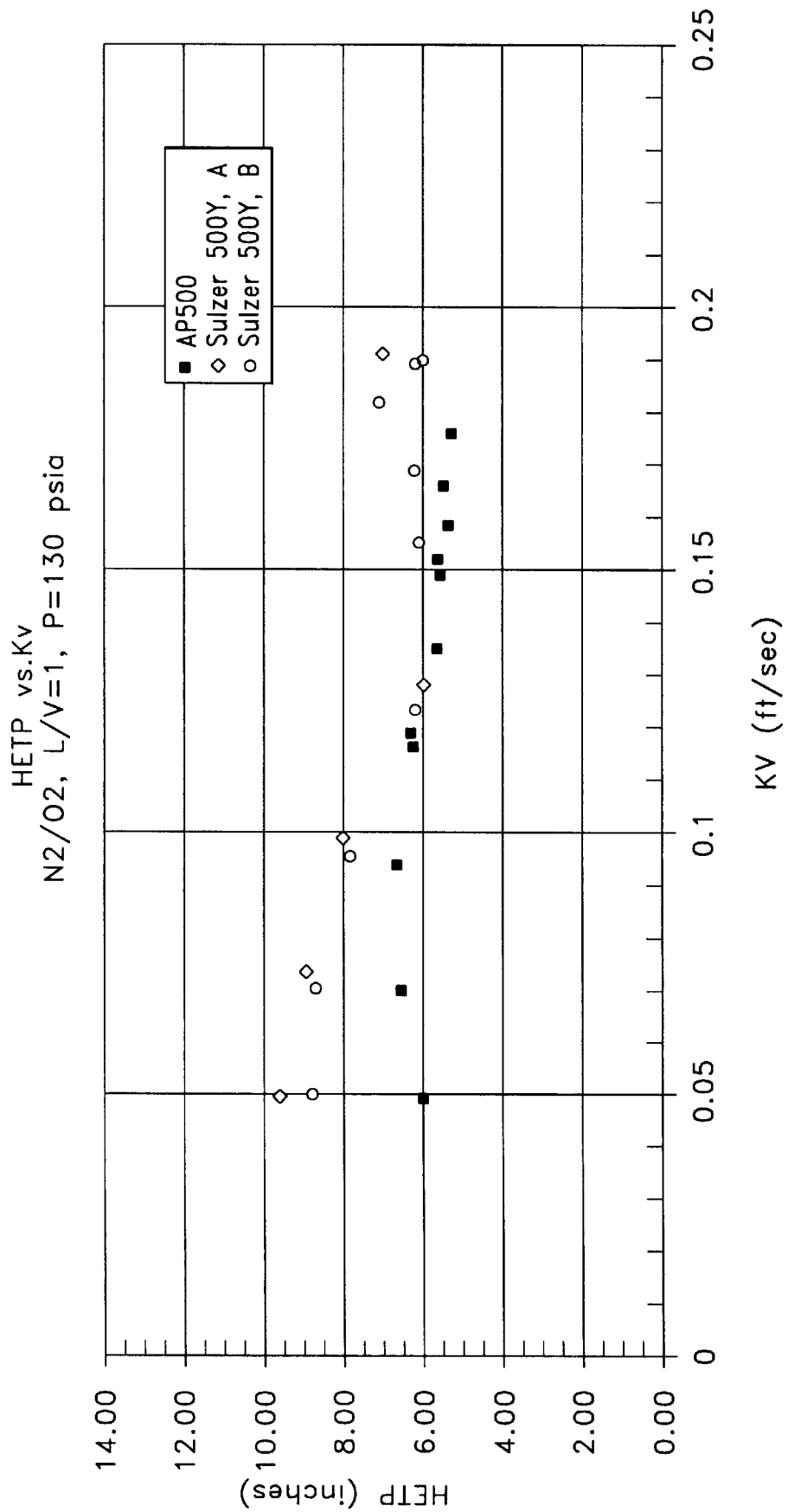
Figure 9B:
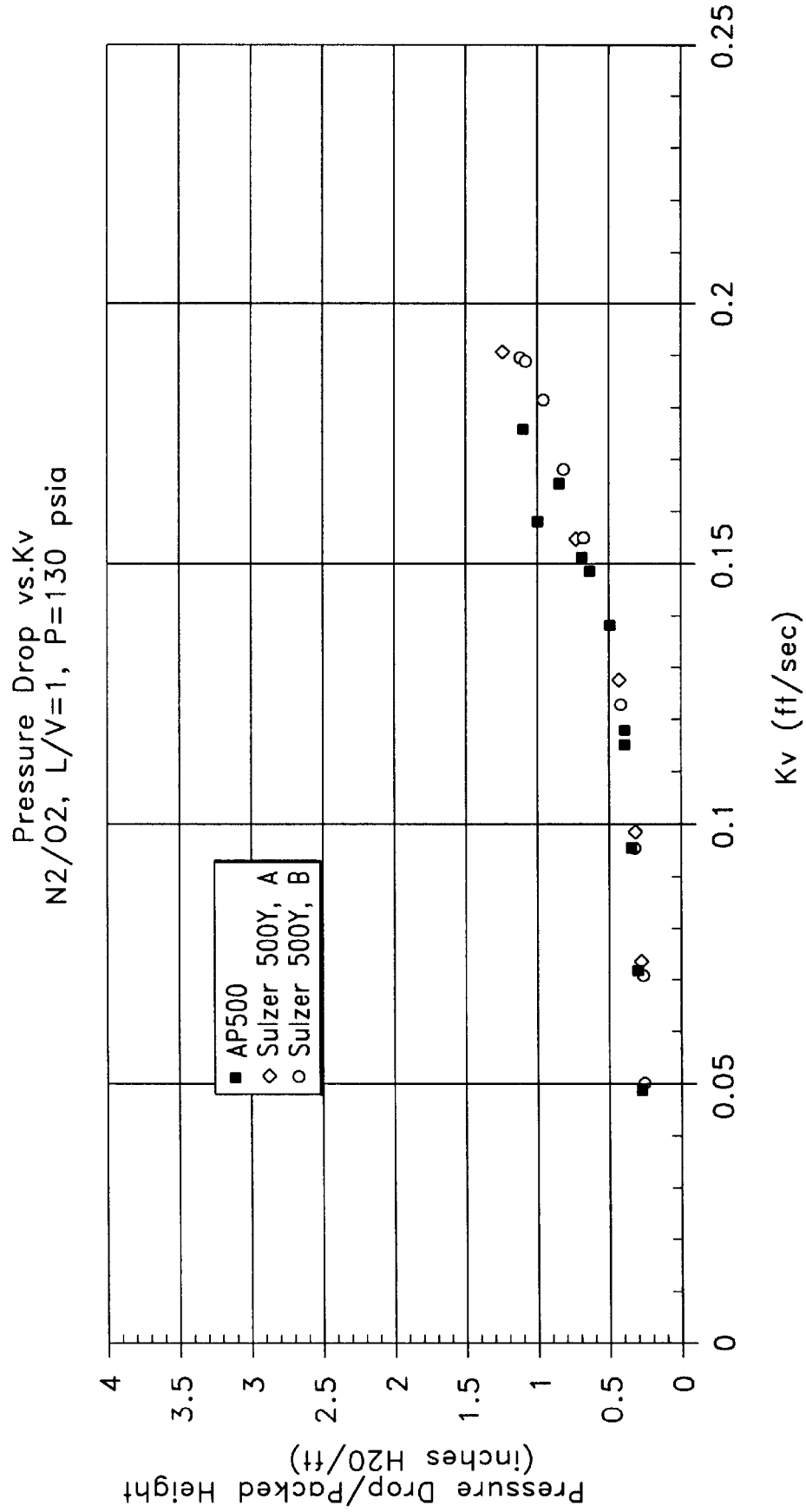
Figure 10D:
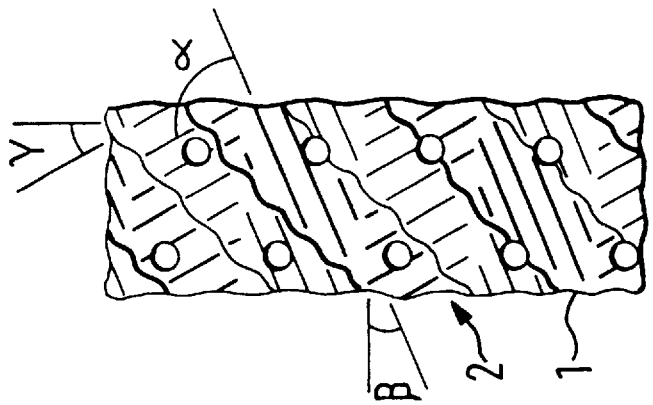
FIGS. 10a to 10d are front elevations of variations of the example of FIG. 1.
Figure 10C:
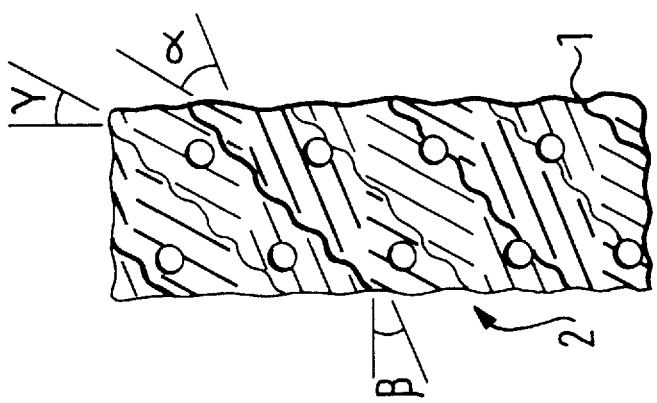
Figure 10B:
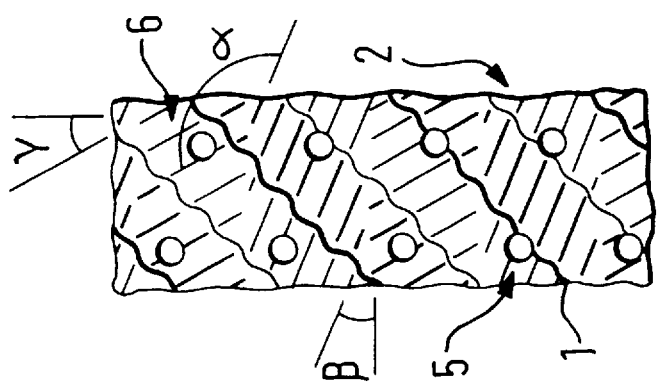
Figure 10A:
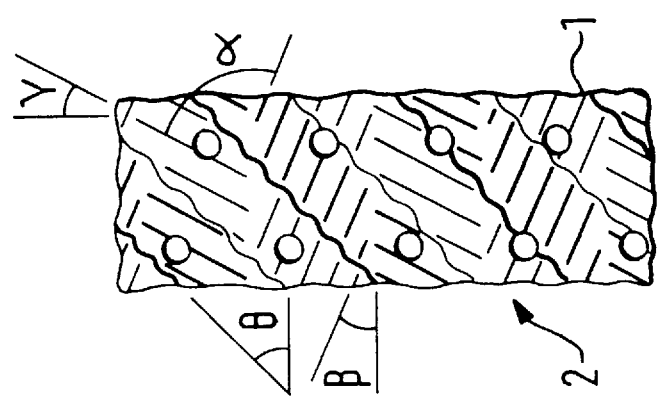

In FIGS. 1 to 3, there is shown a first example of a packing element 1. In the drawings, generally only a representative portion of a packing element 1 is shown.

The element 1 is a sheet-like structure and is provided with regularly spaced, relatively deep, corrugations 2 which form peaks 3 and troughs 4 in the element 1. It will be appreciated that a peak viewed from one side of the element 1 will be a trough when viewed from the other side of the element 1 and vice versa. In use in a cryogenic air separation tower for example, the element 1 is packed vertically as shown in FIGS. 1 and 2 and as will be discussed further below. The corrugations 2 are substantially parallel and have a longitudinal axis 21 which is at an angle θ to the horizontal. As best seen from FIG. 2b, the corrugations 2 are generally sinusoidal. However, different profiles for the corrugations 2 are possible, such as, for example, pleated, square wave, triangular wave, and sawtooth wave, or the corrugations may be composed of elliptical or parabolic profiled segments, for example.

The element 1 is provided with a particular surface texture which greatly improves the performance of the element compared to the known packing elements. In particular, the element 1 has bands of what shall be termed herein "fluting", the fluting providing a bidirectional surface texture in which there are bands of generally horizontal fluting 5 and bands of generally vertical fluting 6 in the vertically packed corrugated element 1. The fluting 5,6 is formed by relatively fine grooves 7,8 or corrugation or striation of the surface of the element 1 in a manner which in itself is known, e.g. by stamping or rolling with a suitable die. As will be seen from FIG. 1 and FIG. 3 (which shows a packing element 1 which has not yet been corrugated, hereinafter termed an "undeveloped element"), the horizontal fluting 5 is substantially continuous and is broken only at the fold lines of the corrugations 2. On the other hand, the vertical fluting 6 is interrupted at regular intervals by the horizontal fluting 5. As can be seen in the drawings, particularly in FIG. 3, in the preferred embodiment, the fine grooves 7 of the horizontal fluting 5 may be staggered relative to one another adjacent the fold lines of the corrugations. Similarly, in the preferred embodiment, the fine grooves 8 of the vertical fluting 6 may be staggered relative to one another adjacent the fold lines of the corrugations.

The widths $B_h$ and $B_v$ of each band of horizontal and vertical fluting 5,6 are preferably equal. The angle α' between the horizontal fluting 5 and the vertical fluting 6, i.e. between the fine grooves of the horizontal fluting 5 and the vertical fluting 6, is less than 90° in the undeveloped element 1 so that when the element 1 is developed by folding to provide the corrugations 2, the horizontal and vertical fluting 5,6 are at an angle α which is greater than α' and which is preferably 90° as shown in FIG. 2a. It will be understood that the relationship between α and α' is determined by the angles at the peaks 3 and troughs 4 of the corrugations 2 (or, put another way, by the depth and wavelength of the corrugations 2) so that the desired value for α is achieved when the corrugations 2 are formed, as will be further described below with reference to FIG. 12.

The element 1 is provided with a plurality of through holes 9 in an array across the element 1. The through holes 9 may be in a regular array or may be distributed randomly across the element 1.

The following results are presented as illustrative examples of the performance characteristics of the packing element 1 according to the present invention as described above. The element 1 is packed in a known manner as a "brick" consisting of many such elements 1, for example, forty. The orientation of adjacent elements 1 is reversed such that the corrugations 2 of adjacent elements 1 cross each other and so that the peaks 3 of adjacent elements 1 touch. Eight such bricks, which are approximately 8" (200 mm) in diameter and 8" (200 mm) in height, are placed on top of each other inside a cryogenic distillation column operating under total internal reflux. The separation of binary mixtures of argon/oxygen (18, 30 and 45 psia (124, 207, and 310 kPa)) and nitrogen/oxygen (30, 70 and 130 psia (207, 483, and 896 kPa)) were studied to ascertain the mass transfer efficiency and pressure drop. For comparison purposes, experiments were conducted under similar conditions with eight bricks using the packing elements disclosed in U.S. Pat. No. 4,296,050 marketed by Sulzer Brothers Ltd. and known commercially as Sulzer 500Y. Although the mechanical details and features between the two types of packing elements differ—shapes of the corrugations, hole size and location details, and bi-directional versus uni-directional surface texture—there are substantial similarities. The depths and wavelengths of the fluting are similar. Also, the surface area densities and porosity, in terms of the total open area proportion of the sheet from which the samples have been produced, are nearly identical. Both sets of elements were made of aluminum. Further, the protocol in terms of vapor and liquid distribution and the manner in which data have been obtained and reduced are identical.

The results are shown in FIGS. 4 to 9, with the present invention depicted as AP500. In each pair of Figures, Figure "a" shows the mass transfer efficiency in terms of HETP (Height Equivalent to a Theoretical Plate) and Figure "b" shows the pressure drop per unit height of packing. The Height Equivalent to a Theoretical Plate is a well-known method in the art to compare different types of packing and means the height over which a composition change is achieved which is equivalent to the composition change achieved by a theoretical plate. Both quantities are presented as functions of $K_v$, which is defined as follows:

$$K_v = U[(\rho_v/\rho_1-\rho_v)]^{0.5}$$

where

U=Superficial velocity of the vapor phase in the column,
$\rho_v$=density of the vapor phase, and
$\rho_1$=density of the liquid phase.

The following observations can be made from FIGS. 4–9. AP500 shows a 10–15% improvement in mass transfer efficiency, as seen by a 10–15% reduction in HETP at high loadings or typical operating conditions represented by the high $K_v$ end of the figures. Typically, the HETP is also much lower at lower loadings or turndown conditions, as represented by the low $K_v$ end of the figures. The pressure drop between the two types of packing is similar except very near the flood points, when sometimes AP500 shows a steeper increase versus $K_v$ relative to Sulzer 500Y. From an operational utility perspective, structured packing is generally used only up to a maximum of about 80–90% of the $K_v$ where flooding occurs. Thus, it is clearly evident that AP500 yields better mass transfer efficiency at equivalent pressure drop per unit height over a wide range of operating conditions, as shown by the data above. Alternatively, AP500 can be said to have a 10–15% advantage in terms of both the height and pressure drop of a packed section over Sulzer 500Y, when they both accomplish the same separation with the same number of theoretical stages. The same conclusion is reached if the data were to be reduced and presented in terms of HTU (Height of a Transfer Unit) which is another well known indicator of mass transfer efficiency analogous to HETP.

Variations of the example shown in FIGS. 1 to 3 are shown in FIG. 10. The two types of fluting 5,6 in the surface texture are not exactly horizontal and vertical as they appear in FIG. 2a. Instead, the generally horizontal and generally vertical fluting 5,6 make angles of β and γ respectively with the horizontal and vertical directions as shown in FIG. 10. The included angle α may increase, decrease or stay the same at 90°. The first example shown in FIGS. 1 to 3 can be regarded as a special case of the general examples shown in FIGS. 10a to 10d in which both β and γ are zero and α is 90°.

Preferably, the dimensions, locations and sizes of the corrugations 2, the holes 9 and the bi-directional surface texture formed by the fluting 5,6, are chosen such that only random combination patterns develop and no regularly repeating patterns of the three features occur on the packing element 1.

Below is discussed some possible ranges of dimensions for the element 1 and its component features.

The surface area density of the element 1 is preferably in the range of 250–1500 m$^2$/m$^3$. with a most preferred range of 500–1000 m$^2$/m$^3$. This can be realized through many different combinations of P, H and r shown in FIG. 2d, P being the "wavelength" or peak-to-peak separation of the corrugations 2, H being the amplitude or peak-to-peak height of the peaks 3, and r being the radius of curvature of a peak 3.

The corrugations 2 run in a generally sinusoidal wave pattern. The corrugations can be manufactured with curved peaks 3 and straight portions in between the peaks 3. The ratio of the corrugation wavelength to the corrugation radius of curvature (P/r in FIG. 2d) is in the range of 5–30, with a preferred range of 10–25.

The thickness of the sheet (t in FIG. 2d) is preferably in the range of 0.05–1.0 mm with a most preferred range of 0.10–0.25 mm.

The open area of the element 1 is preferably in the range of 5–20%, with a most preferred range of 8–12%, of the total area of the element 1.

The holes 9 in the packing are circles with a diameter in the range of 1–5 mm, with a preferred range of 2–4 mm. Alternatively, the holes in the packing are not circular, but their equivalent diameters—calculated as four times the area divided by the perimeter—are in the range mentioned above for circular holes.

The width of the bands of the bi-directional structure formed by the horizontal and vertical fluting 5,6 ($B_h$ and $B_v$, shown in FIG. 3) are in the range of 2 to 20 mm each, with a preferred range of 5–10 mm. The bands can be of unequal widths so that $B_h \neq B_v$.

Figure 11:
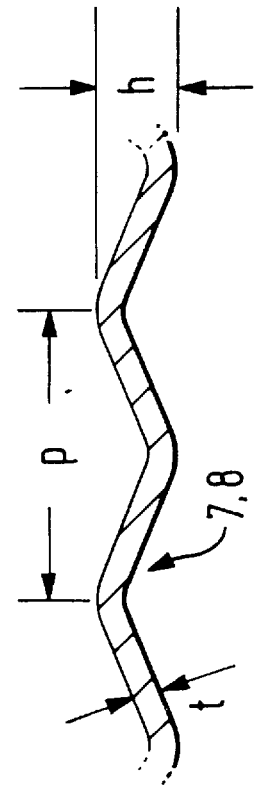
FIG. 11 is a cross-sectional view through fluting of an element.

The wavelength (p in FIG. 11) of the fine grooves 7,8 of the surface texture forming the bands of horizontal and vertical fluting 5,6 is in the range of 0.5–5 mm with a preferred range of 1–3 mm. The pitches or wavelength in the horizontal and vertical fluting 5,6 can be different.

The peak-to-peak height of the surface texture (h in FIG. 11) is in the range of 0.25–1.20 mm with a preferred range of 0.25–0.50 mm. The peak-to-peak height can be different in the horizontal and vertical fluting 5,6.

The corrugation angle with the horizontal (θ in FIG. 2a) is in the range of 20°–70° with a preferred range of 30°–60° and is most preferably 45°.

The included surface texture angle α of the developed element 1 (shown in FIG. 2a) is in the preferred range of 30°–150° with a more preferred range of 80°–10°, and most preferably 90°.

The "horizontal" surface texture angle β (shown in FIG. 10) is in the range of −45°−+45°, preferably in the range of −30°−+30°, more preferably −10°−+10°, and most preferably 0°.

The "vertical" surface texture angle γ (shown in FIG. 10) is in the range of −45°−+45°, preferably in the range of −30°−+30°, more preferably −10°−+10°, and most preferably 0°.

The three features of the corrugations, holes and surface texture are arranged in such a manner that repeating patterns do not occur. Successive corrugations look different and the combinations are random. This is preferred. Alternatively, the three features of the corrugations, holes and surface texture are arranged in such a manner that repeating patterns do occur. Successive corrugations look similar, with the patterns repeating after one or more corrugations.

The material of the packing element 1 is stainless steel, monel, brass, aluminum, copper or their alloys or plastics, or any other suitable material.

The corrugations 2 and surface texture or fluting 5,6,7,8 are generally manufactured by a process such as rolling or pressing which determines the exact nature of the waves of each feature produced. They are generally sinusoidal in nature, but they need not be exactly sinusoidal.

Alternatively, the surface texture may be produced by other well-known manufacturing techniques such as milling, cutting or grinding.

The structured packing element 1 of the present invention can be used in a mass and/or heat transfer process such as distillation or direct contact cooling. A section of a column or tower is packed with the segments of the element, stacked vertically and with means to distribute liquid uniformly from above and vapor or gas uniformly from below. The liquid and vapor or gas flow under the influence of gravity in roughly countercurrent directions to each other. In many cases, it is advantageous to use a column with its axis along the vertical direction, but the present packing element 1 may also be used where the column axis is not vertical, but is instead in a horizontal or some other intermediate orientation. However, the relationship between the packing layers, the liquid and vapor flow, and the distributors would have to be maintained as before.

Specifically, it is advantageous to use the present packing element 1 for a gas-liquid or vapor-liquid contacting device, for which the ability to wet the packing and to spread and remix the liquid are critical.

More specifically, it is advantageous to use the present packing element 1 for separation processes that employ cryogenic distillation. Examples of cryogenic distillation include separation of the components of air by using one or more contacting devices such as columns. The current packing element 1 may be used in one or more sections of these contacting devices.

Also, it is advantageous to use the present packing element 1 for direct contact cooling applications. An example of this process is a tower that cools hot or warm air with cooler water, by direct contact between the phases wherein both heat and mass transfer take place. The element 1, though without through holes 9, may also be used in a heat exchanger in which the hot and cold phases exchange heat without coming into contact with each other.

Without wishing to be bound by any particular theory, it is believed that the benefits of the present invention derive as follows. Generally, the flow of gas through a column incorporating the elements 1 of the present invention is basically unchanged compared to the prior art. However, the liquid flow characteristics are believed to be very different. The vertical fluting 6 provided by the fine vertical grooves 8 causes liquid to flow through the holes 9 so that liquid passes back and forth through the elements 1 as the liquid travels down a column incorporating the elements 1. It is believed that the liquid passes through the holes by a combination of gravity and capillary action. This promotes better heat and mass transfer between the liquid and gaseous phases in the column. Furthermore, at the contact points between peaks 3 of adjacent elements 1, the fine vertical grooves 8 provide multiple passageways which allow liquid to transfer between adjacent elements 1 more easily. Again, this encourages better heat and mass transfer. The horizontal fluting 3 provided by the fine horizontal grooves 7 allows lateral spreading of the liquid passing down the column, causing hold up of the liquid flow and thus promoting better heat and mass transfer and preventing the liquid from descending rapidly down the column. Thus, the element 1 of the present invention causes the liquid to be spread over a large area and also causes the liquid to remix repeatedly, both of which provide for much improved mass and heat transfer.

Figure 12:
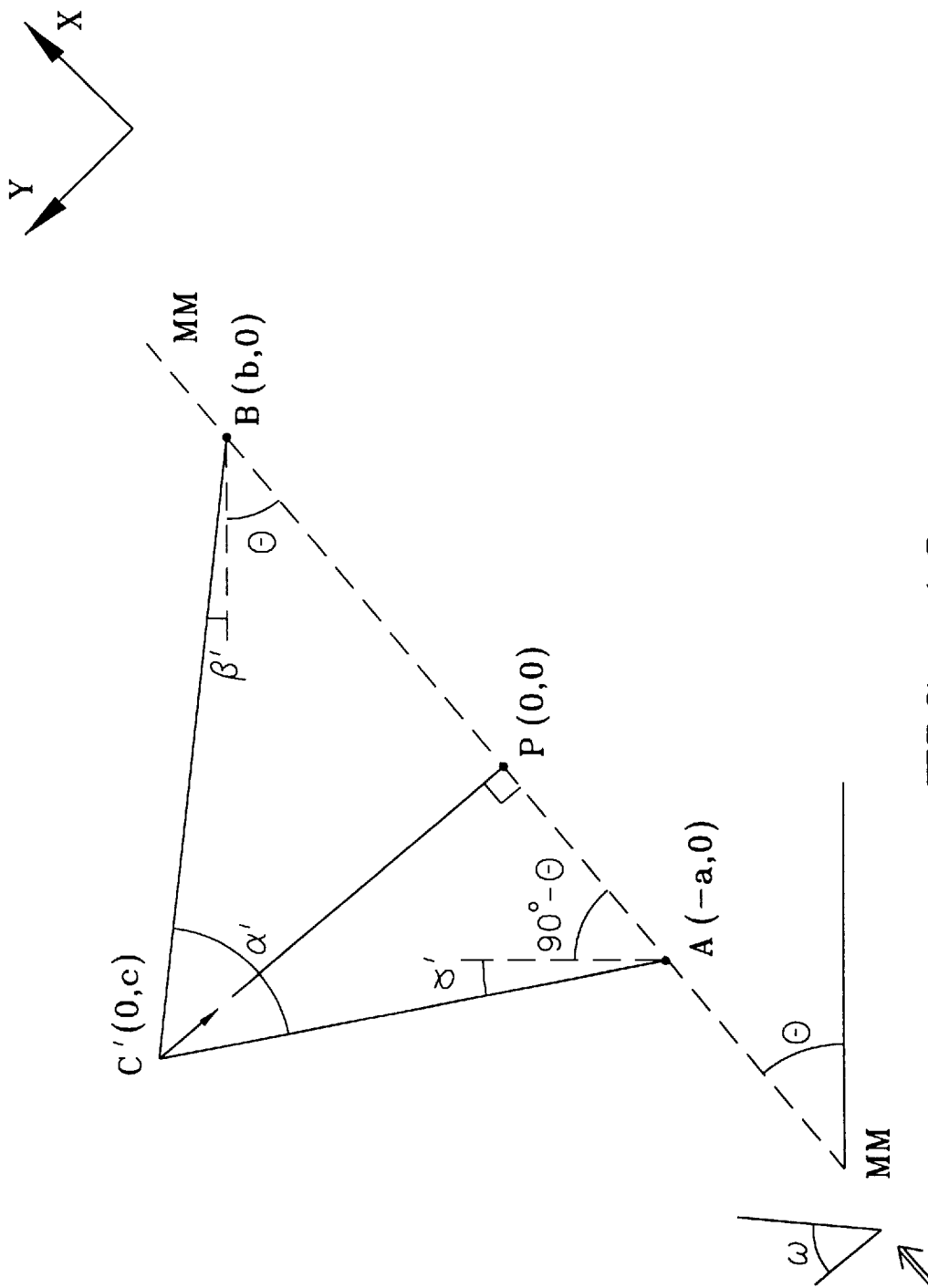
FIG. 12 is a diagram for explaining the relationships between the angles of the corrugations and fluting.

In FIG. 12, there is shown a representation of the element 1 in its undeveloped state, i.e. prior to formation of the corrugations 2. The line mm—mm represents a peak 3 or trough 4 along which a typical corrugation runs in the developed element 1. The line C'A represents a typical "vertical" groove 8 and the line C'B represents a typical "horizontal" groove 7. On an undeveloped element, there can therefore be found a triangle C'AB. The angles α', β', γ' are the angles in the undeveloped sheet which correspond to the angles α, β, γ in the developed sheet mentioned above, i.e. α, β, γ are the plane-of-paper projections of α', β', γ'.

When the element 1 is folded to produce the corrugations 2, the points A, P, B remain fixed and the point C' moves through an angle ω with the projection of C' on the plane of the paper moving towards P. The following therefore hold true for the simple case where a corrugation 2 can be regarded as triangular (with two triangles per wavelength).

In the flat, undeveloped element:

$$a = \frac{c}{\tan(90° - \theta + \gamma')}$$

$$b = \frac{c}{\tan(\theta + \beta')}$$

In the developed element:

$$a = \frac{c\cos\omega}{\tan(90° - \theta + \gamma)}$$

$$b = \frac{c\cos\omega}{\tan(\theta + \beta)}$$

Thus, $$\tan(90° - \theta + \gamma') = \frac{\tan(90° - \theta + \gamma)}{\cos\omega}$$

giving the relationship between γ and γ', and $$\tan(\theta + \beta') = \frac{\tan(\theta + \beta)}{\cos\omega}$$

giving the relationship between β and β'. Furthermore, $\alpha'=180°-(90°-\theta)-\theta-\beta'-\gamma'$ $\alpha'=90°-\beta'-\gamma'$ $\alpha=90°-\beta-\gamma.$ The element of the present invention can also be used in a process for exchanging mass and/or heat between two liquids, comprising contacting said liquids in at least one exchange column wherein liquid—liquid contact is established by at least one structured packing element, the element being corrugated with corrugations which form alternating peaks and troughs across the element, the corrugations having a longitudinal axis, the element having at least one band of first fluting at an angle between 0° and 180° to the longitudinal axis of the corrugations and at least one band of second fluting at an angle between 0° and 180° to the longitudinal axis of the corrugations, the first fluting being at an angle greater than zero to the second fluting, wherein one of said liquids preferentially wets said packing element. Said liquids may flow co-currently or counter-currently in the exchange column.

The present invention has been described with particular reference to the examples illustrated. However, it will be appreciated that variations and modifications may be made to the example described within the scope of the present invention.

We claim:

1. A structured packing element having corrugations which form alternating peaks and troughs across the element, the corrugations having a longitudinal axis, the element having bands of first fluting at an angle between 0° and 180° to the longitudinal axis of the corrugations and bands of second fluting, wherein the first fluting is substantially continuous across the element and intersects the second fluting at an angle in the range of 30° to 150° to the second fluting, and further including holes creating open area through the element.

2. The element of claim 1, wherein the open area of the element is in the range of 5% to 20% of the total area of the element.

3. The element of claim 1, wherein the band of first fluting has a width in the range of 2 to 20 mm.

4. The element of claim 1, wherein the band of second fluting has a width in the range of 2 to 20 mm.

5. The element of claim 1, wherein the second fluting is formed by grooves having a wavelength in the range of 0.5 mm to mm.

6. The element of claim 1, wherein the angle (α) between the first fluting and the second fluting of the developed element as seen in elevation is substantially 90°.

7. The element of claim 1, wherein the first fluting is formed by grooves having a wavelength in the range of 0.5 mm to 5 mm.

8. An exchange column for exchanging heat and/or mass between a first phase and a second phase, the exchange column having at least one structured packing comprising a plurality of packing elements, each element having corrugations which form alternating peaks and troughs across the element, the corrugations having a longitudinal axis, each element having bands of first fluting at an angle between 0° and 180° to the longitudinal axis of the corrugations and bands of second fluting, wherein the first fluting is substantially continuous across the element and intersects the second fluting at an angle in the range of 30° to 150° to the second fluting, and further including holes creating open area through the element.

9. The column of claim 8, wherein the elements are packed substantially vertically, the first fluting forming an angle of between 0° and 45° with the horizontal.

10. The column of claim 8, wherein the elements are packed substantially vertically, the first fluting being substantially horizontal.

11. The column of claim 8, wherein the elements are packed substantially vertically, the second fluting forming an angle substantially between 0° and 45° with the vertical.

12. The column of claim 8, wherein the elements are packed substantially vertically, the second fluting being substantially vertical.

13. The column of claim 8, wherein the packing elements are packed substantially vertically, the longitudinal axis of the corrugations being at an angle substantially between 20° and 70° with the horizontal.

14. The column of claim 8, wherein the packing elements are packed substantially vertically, the longitudinal axis of the corrugations being at an angle of substantially 45° with the horizontal.

15. A process for cryogenic air separation comprising contacting vapour and liquid countercurrently in at least one distillation column containing at least one mass transfer zone wherein liquid-vapour contact is established by at least one structured packing element as in any one of claims 1–7.

16. A process for exchanging mass and/or heat between two liquids, comprising contacting said liquids in at least one exchange column wherein liquid—liquid contact is established by at least one structured packing element as in any one of claims 1–7.

17. A structured packing element comprising a corrugated plate having a bidirectional surface texture in the form of fine grooves in crisscrossing relation applied on the surface of the corrugated plate.

18. An exchange column for exchanging heat and/or mass between a first phase and a second phase, the exchange column having at least one structured packing element as in claim 17.

19. A process for cryogenic air separation comprising contacting vapor and liquid counter-currently in at least one distillation column containing at least one mass transfer zone wherein liquid-vapor contact is established by at least one structured packing element as in claim 17.

20. A process for exchanging mass and/or heat between two liquids, comprising contacting said liquids in at least one exchange column wherein liquid—liquid contact is established by at least one structured packing element as in claim 17.

21. A structured packing element as in claim 17, wherein the corrugations of the plate are generally regularly spaced and in substantially parallel relationship, and wherein the bidirectional surface texture comprises a plurality of generally parallel bands of a generally horizontal first fluting in the form of fine grooves and a plurality of generally parallel bands of a generally vertical second fluting in the form of fine grooves, the bands of first fluting being substantially continuous across the surface of the plate and the bands of second fluting being interrupted at generally regular intervals across the surface of the plate at points of intersection with the first fluting bands, the first fluting being at an angle ($\alpha$) greater than 30° and less than 150° to the second fluting.

22. A structured packing element as in claim 21 wherein the width of each band of first and second fluting is in the range of 2 to 20 mm.

23. A structured packing element as in claim 21 wherein the angle ($\alpha$) between the first fluting and the second fluting is in the range of 80° to 100°.

24. A structured packing element as in claim 21 wherein the angle ($\alpha$) between the first fluting and the second fluting is substantially 90°.

25. A structured packing element as in claim 21 wherein the corrugations are formed along fold lines, the grooves of the horizontal fluting are staggered relative to one another adjacent the fold lines, and the grooves of the vertical fluting are staggered relative to one another adjacent the fold lines.

26. A structured packing element as in claim 25 wherein the wavelengths of the first fluting and second fluting are in the range of 0.5 mm to 5 mm.

27. A structured packing element as in claim 21 further including a plurality of apertures in the corrugated plate.

28. A structured packing element as in claim 27 wherein the apertures create open area in the range of 5% to 20% of the total surface area of the element.

29. An exchange column for exchanging heat and/or mass between a first phase and a second phase, the exchange column having structured packing which includes packing elements as in any one of claims 21–28.

30. An exchange column as in claim 29, wherein the structured packing elements are packed substantially vertically, the first fluting forming an angle substantially between 0° and 45° with the horizontal.

31. An exchange column as in claim 29, wherein the structured packing elements are packed substantially vertically, the first fluting being substantially horizontal.

32. An exchange column as in claim 29, wherein the structured packing elements are packed substantially vertically, the second fluting forming an angle substantially between 0° and 45° with the vertical.

33. An exchange column as in claim 29, wherein the structured packing elements are packed substantially vertically, the second fluting being substantially vertical.

34. An exchange column as in claim 29, wherein the structured packing elements are packed substantially vertically and the corrugations of each structured packing element have a longitudinal axis at an angle substantially between 20° and 70° with the horizontal.

35. An exchange column as in claim 29, wherein the structured packing elements are packed substantially vertically and the corrugations of each corrugated plate of each structured packing element have a longitudinal axis at an angle substantially 45° with the horizontal.

36. A process for cryogenic air separation comprising contacting vapor and liquid counter-currently in at least one distillation column containing at least one mass transfer zone wherein liquid-vapor contact is established by at least one structured packing element as in any one of claims 21–28.

37. A process for exchanging mass and/or heat between two liquids, comprising contacting said liquids in at least one exchange column wherein liquid—liquid contact is established by at least one structured packing element as in any one of claims 21–28.

38. A process as in claim 37, wherein said liquids flow co-currently in the exchange column.

39. A process as in claim 37, wherein said liquids flow counter-currently in the exchange column.

40. A method for manufacturing a structured packing element, comprising the steps of:

providing a plate;

forming a bidirectional surface texture in the form of fine grooves in crisscrossing relationship on the surface of the plate; and forming corrugations in the plate, said corrugations being generally regularly spaced and in substantially parallel relation.

41. A method for manufacturing a structured packing element as in claim 40, wherein said step of forming a bidirectional surface texture comprises the steps of:

forming a plurality of generally parallel bands of a generally horizontal first fluting in the form of fine grooves, the bands of first fluting being substantially continuous across the surface of the plate; and forming a plurality of generally parallel bands of a generally vertical second fluting in the form of fine grooves, the bands of second fluting extending across the surface of the plate but being interrupted at generally regular intervals at points of intersection with the bands of first fluting, the first fluting being at an angle ($\alpha$) greater than 30° and less than 150° to the second fluting.

42. A method for manufacturing a structured packing element as in claim 41, wherein the corrugations are formed in the plate along fold lines, the fine grooves of the horizontal fluting are staggered relative to one another adjacent the fold lines, and the fine grooves of the vertical fluting are staggered relative to one another adjacent the fold lines.

43. A method for manufacturing a structured packing element as in claim 40 further comprising the step of forming a plurality of apertures in the plate.

* * * * *

UNITED STATES PATENT AND TRADEMARK OFFICE
CERTIFICATE OF CORRECTION

PATENT NO. : 5,876,638
DATED : 03/02/99
INVENTOR(S) : Swaminathan Sunder et al.

It is certified that error appears in the above-identified patent and that said Letters Patent is hereby corrected as shown below:

Column 9, Lines 62 and 63

Delete "of the developed element as seen in elevation".

Signed and Sealed this

Sixth Day of July, 1999

Q. TODD DICKINSON

*Attest:*

*Attesting Officer*     Acting Commissioner of Patents and Trademarks